United States Patent [19]
Pook

[11] Patent Number: 4,504,550
[45] Date of Patent: Mar. 12, 1985

[54] RELEASABLY MUTUALLY-ADHERENT MATERIALS

[75] Inventor: Harold W. M. Pook, Bromley, England

[73] Assignee: James Frederick John Johnson, Holmer, England

[21] Appl. No.: 511,881

[22] Filed: Jul. 8, 1983

[30] Foreign Application Priority Data

Jul. 21, 1982 [GB] United Kingdom ............... 8221050

[51] Int. Cl.$^3$ .................. B32B 15/08; B32B 27/08
[52] U.S. Cl. .................................... 428/461; 428/187;
428/195; 428/464; 428/480; 428/483; 428/535;
428/913.3
[58] Field of Search .............. 428/458, 461, 16, 522,
428/131, 464, 187, 480, 483, 535, 913.3;
434/295; 46/DIG. 1

[56] References Cited

U.S. PATENT DOCUMENTS 3,274,706 9/1966 Friend .......................... 434/295
3,440,750 4/1969 Toth et al. .................... 428/16 X
3,547,340 12/1970 McDonald .................... 428/131 X
4,211,825 7/1980 Shipman ....................... 428/461 X
4,275,112 6/1981 Savage, Jr. .................... 428/522 X Primary Examiner—Thomas J. Herbert
Attorney, Agent, or Firm—Collard, Roe & Galgano

[57] ABSTRACT

A combination of two mutually-adherent laminae is applied to the removable fixing of display or decorative material. A first lamina of PVC is a component of a tri-laminate, including an aluminum foil intermediate layer and a paper backing layer. The backing layer allows the tri-laminate to be secured to a display board or wall, for example using a wallpaper type paste. The display or decorative material is in the form of a sheet, which is laminated using an adhesive to the front surface of a second lamina of polyester terephthalate. When said bi-laminate is pressed into intimate surface contact with the exposed front surface of the lamina it adheres strongly thereto, but can readily be peeled off and replaced when this is required.

10 Claims, 8 Drawing Figures

RELEASABLY MUTUALLY-ADHERENT MATERIALS

BACKGROUND OF THE INVENTION

1. Field of the Invention

This invention relates to releasably mutually-adherent laminar materials, which may be in sheet or strip form. It provides the combination of two such laminae which have mutually compatible properties such that they are strongly adherent one to the other when pressed into intimate surface contact, without the use of an adhesive or mechanical means, but which can readily and repeatedly be separated and pressed back into mutually-adhering relationship.

2. Description of the Prior Art

There have been many proposals by which two laminar sheets can be caused to adhere without the use of an adhesive. Apart from the use of mechanical means, such as a Velcro-like surface formation, these either rely on electrostatic attraction or on atmospheric pressure with the air excluded from between the contacting surfaces.

SUMMARY OF THE INVENTION

A principal object of the invention is to provide a novel combination of materials which are mutually adherent under combined electrostatic attraction and atmospheric pressure, the electrostatic component having a high degree of permanence and an enhanced effect.

The invention resides in a combination of two plastics polymer laminae, having different but compatible physical and electrical characteristics whereby respective surfaces thereof are mutually adherent when pressed into surface contact, comprising:

- a first lamina having a permanent or quasi-permanent electrostatic charge of negative polarity and a ductile polished surface providing a relatively high degree of surface friction; and
- a second lamina which either has a positive electrostatic charge or is capable of being polarised by induction to acquire such a charge, which has a stable polished surface and which is of high tensile strength;
- said first lamina having a trapped compensating electrostatic charge on its other surface by virtue of a closely disposed element attached to that surface.

As a result of the foregoing properties the two laminae are strongly mutually adherent when pressed into intimate surface contact. The laminae materials can be chosen from commercially available polymer films, exploiting the required characteristics which appear as a result of the manufacturing processes used in the production of such films. A preferred material for the first lamina is PVC sheet, whereas the second is desirably a polyester material and preferably is polyester terephthalate.

Said contacting element may be a metallic film, either a metal foil attached to the first lamina or a metallized layer applied thereto by a vacuum deposition technique. However, this contacting element may be the second lamina itself thus providing a bi-laminated arrangement, which may be used as a binding or strapping strip, with one surface which is strongly but releasably adherent to its other surface. In either case the attachment may be by means of a suitable adhesive, and when a separate element is used it may on its other side be attached, again by a suitable adhesive, to a backing layer or board.

The invention has many practical applications. As a bi-laminate it is, for example, useful as a re-usable strapping for parcels and the like which have to be opened for customs inspection. Even when re-use is not required, the self-adhering property facilitates packaging as no adhesive is required. When the two laminae are separate, the first can be fixed to the front surface of a notice or display board and the second provide or be attached to display matter. As a further example, the first lamina can have a backing allowing it to be pasted onto to a surface to be decorated, such as a wall surface, with the second laminated to the back of decorative sheet material which may be a mural or other wall covering material. With such an arrangement the mural or wall covering can readily be changed at any time. A further practical example is in the medical field, as a self-adhering and re-usable strapping to retain a splint or wound dressing in place.

Other features of the invention will be apparent from the following description, drawings and claims, the scope of the invention not being limited to the drawings themselves as the drawings are only for the purpose of illustrating ways in which the principles of the invention can be applied. Other embodiments of the invention utilising the same or equivalent principles may be used and structural changes may be made as desired by those skilled in the art without departing from the present invention and the purview of the appended claims.

DESCRIPTION OF THE PREFERRED EMBODIMENTS

Most plastics polymer film material, by virtue of a large surface to volume ratio and high electrical insulation properties accumulates static charges during processing and handling. Such charges are generally located on the surface and are non-permanent, being removable by means well known in the plastics industry.

However, with one type of material it is inherent in its formulation and processing that conditions should result which lead to the creation of permanent or quasi-permanent electrostatic charges—the term "quasi-permanent" as used herein signifying that the time constant of charge decay exceeds the useful life of the material, and this time constant may be measurable in terms of years.

In a polymer a large number of molecules are joined to form a long macro-molecular chain which can assume various spatial configurations. At high temperatures parts of the main chain in materials of said one type become mobile and flexible so that the polymer softens and becomes of a "rubbery" nature, and the temperature at which re-arrangement of portions of the main chain occurs is termed the "glass-rubber transition temperature". At this temperature the polymer is in a condition at which it can be made to acquire an electrical charge which can be permanent or remain for long periods of time, and such charges are termed "electret" charges. The first lamina of the invention is a material of this type, preferably being PVC produced by a manufacturing process which results in the production of electret charges.

Such PVC is extruded as a highly plasticised polymer and undergoes a rolling and subsequent calendering/polishing process while in a condition in which it is compressible. This is at a temperature below melting point but necessarily above said transition temperature to allow compression to the required final thickness. The rolling and subsequent calendering/polishing operation produces frictional and contact energy which results in the polymer acquiring electrostatic charges. These charges vary in degree and form according to the polymer formulation, and the quantity and nature of impurities present in the polymer. They are developed partly as surface charges and additionally as layer or space charges within the material, or may be in the fixed alignment of dipoles within the molecular structure or a combination of any of these.

Figure 1:
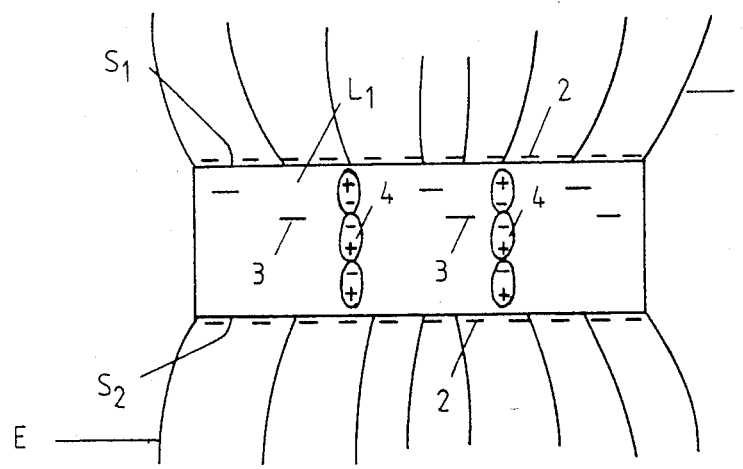
FIGS. 1 and 2 illustrate theoretical concepts underlying the invention.

FIG. 1 is a theoretical cross-section through a sheet or first lamina $L_1$ of such a polymer material, showing deposited surface negative charges 2 on both surfaces $S_1$ and $S_2$ of the sheet. It also shows tribo-electrically developed negative space charges 3 and dipole charges 4 within the material. Such charges are strongly electronegative and develop an external electrostatic field E. In a typical sample of such a PVC material a measurable electrostatic field is produced at a distance of say 15 cm from each surface, and has an open circuit potential at the surface of 3000 volts/cm.

Figure 2:
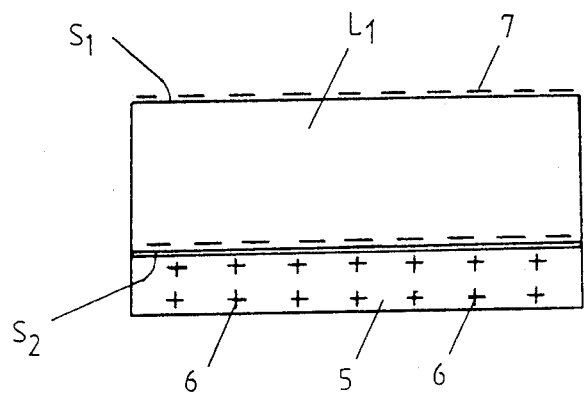

In the first lamina $L_1$ of the invention the electrostatic field E is restricted and contained on, or immediately adjacent, the two surfaces. As illustrated in FIG. 2 this is achieved by establishing a trapped compensating charge on one surface $S_2$ by use of a closely attached element 5. The compensating positive electrostatic charge is indicated at 6, a concentrated useful negative charge 7 being available on the opposite "adherent" surface $S_1$. As will be described more particularly in connection with the practical embodiments illustrated in the remaining drawing figures, the element 5 may be a second lamina of the invention or a separate element such as a metallic foil or metallized carrier material.

The highly-plasticised PVC base material which is used for the first lamina $L_1$ in the embodiments is characterised by an adherent texture and is a soft ductile material which is used in thin films as a self-attaching material, notably in the wrapping of foods and for adhesion to smooth surfaces such as a glass surface. It is produced by extrusion as a laminar material in various thicknesses, and the plasticised PVC used for this purpose has a thickness of from 150 to 250 micron. After extrusion it is subjected to rolling, calendering and polishing processes in order to impart the characteristics required by the invention. This results in the necessary electrostatically-charged condition and in highly polished surfaces $S_1$ and $S_2$ which are substantially flat and elastic, permitting a high degree of close contact and friction between these surfaces and an applied planar material having a stable and highly polished surface.

Figure 3:
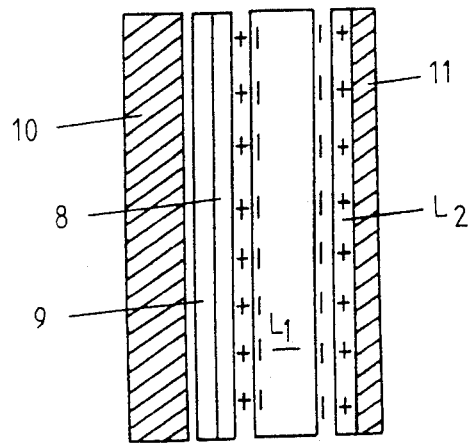
FIGS. 3 to 8 diagrammatically illustrate various practical embodiments of the invention.

FIG. 3 illustrates the application of the invention to the removable fixing of a display or decorative material, for example, to a board or wall surface. The PVC first lamina $L_1$ is a component of a tri-laminate, including an aluminium foil intermediate layer 8 providing the compensating layer 5 of FIG. 2 and itself bonded to a paper backing layer 9. The backing paper 9 allows the tri-laminate to be secured to the board or wall 10, for example using a wallpaper type paste. The display or decorative material is a sheet 11 which is laminated, using a suitable adhesive, to the front surface of the second lamina $L_2$ of the invention. The latter is a polymer of the required characteristics, selected as having a highly polished and flat surface and being of high tensile strength. A particularly suitable material for this lamina is polyester terephthalate.

When the bi-laminate $L_2$:11 is pressed into intimate surface contact with the front surface of the lamina $L_1$ it adheres strongly thereto, but can readily be peeled off and replaced if required. The adherence results from a combination of two effects—electrostatic attraction between the enhanced negative charge on the lamina $L_1$ and the induced positive charge on the lamina $L_2$, and atmospheric pressure acting on the outer surface of the sheet 11 after air has been displaced and excluded from between the mutually adhering surfaces.

Figure 4:
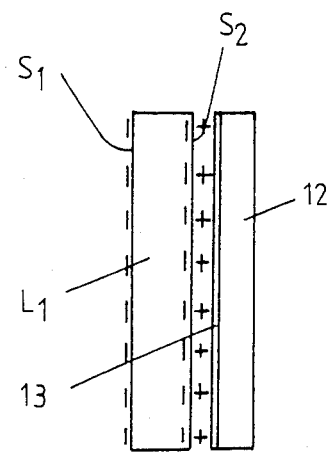

FIG. 4 illustrates an alternative method of applying the metallized backing layer to laminate $L_1$. In this case the attached element producing the compensating charges is a compound element, comprising a polyester sheet 12 with a vacuum-deposited metallized layer 13. This is cemented to the surface $S_2$ with the layer 13 facing the PVC. With this embodiment the polyester sheet 12 can provide the second lamina $L_2$ of the invention also, for use as a wrapping band with one end of the sheet 12 overlapping and contacting, so as to adhere to, the surface $S_1$ of the PVC. The PVC lamina $L_1$ can be clear or coloured as required and/or appropriately decorated or printed with advertising or informative matter.

Figure 5:
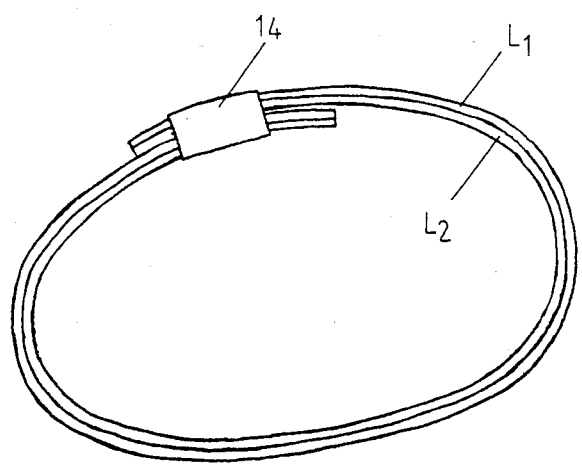

The embodiment of FIG. 5 is a simpler strapping binding, bandaging or the like. In this case a PVC strip providing lamina $L_1$ is directly cemented to a polyester strip providing the lamina $L_2$, the latter also providing the attached element producing the compensating charges. As described with reference to FIG. 4, the bi-laminate strip is wrapped around an object and overlapped to join, the overlapping ends being pressed together to adhere firmly but releasably. As is shown a cross piece 14, of similar bi-laminate material, can be wrapped around the overlap join for additional security. Such a bi-laminate strip is particularly suitable for use in packaging and wrapping when it is easily removable, and replaceable, for customs inspection for example. It allows infinitely variable tension adjustment and is also usable in the medical field as a body strapping, to hold limb splints in position and to hold a wound dressing in place. It can provide a sterile and waterproof means for holding sterile pads in position, without the use of pins or conventional adhesive tape.

For packaging use the two laminae may each be separately provided with a pressure sensitive adhesive protected by a release paper which is peeled off before use. The PVC lamina can then be stuck on to the package, for location purposes, and the polyester lamina stuck on to the PVC to provide a bi-laminate arrangement in accordance with the invention.

In such a bi-laminate the lamina $L_1$ has an exposed polished and ductile frictional surface carrying a strong electro-negative charge, whereas lamina $L_2$ has an exposed highly-polished charge and is of great tensile strength. Thus when the two exposed surfaces of two parts, or two separate pieces, of the bi-laminate are brought into overlapping contact a mutually attractive force results between the oppositely charged surfaces, as governed by Coulombs law. As the surfaces come into intimate contact the distance between the opposite charges approaches a nil value, with a correspondingly high mutually attractive force, and air is excluded from between them with the development of a negative pressure effect, i.e. external atmospheric pressure presses the surfaces together. The combined effect of a high degree of facial friction, electrostatic contact force and atmospheric pressure in holding the two surfaces firmly together, particularly under longitudinal tension, is very striking as evidenced by the result of a test described below.

Figure 6:
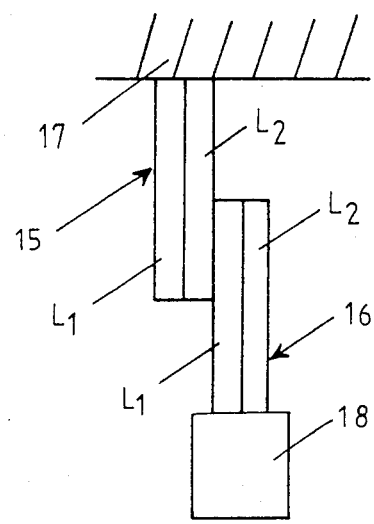

FIG. 6 illustrates how two pieces 15 and 16 of the bi-laminate may be used as a detachable suspension means. The upper end of the piece 15 is firmly attached to a fixed overhead support 17, and the lower end of the piece 16 is secured to the suspended object 18 which may, for example, be a display sign or a notice board. It will be appreciated that two or more spaced suspensions will normally be used so that the sign or board is horizontally located. The lower and upper ends, respectively, of the pieces 15 and 16 are overlapped and pressed together so that they are strongly mutually-adherent in the manner already described.

For the tension test referred to above, a single suspension arrangement as shown in FIG. 6 utilised for the supported object 18 a load of adjustable weight with the upper end of the piece 15 secured to a fixed beam. The lamina strip $L_1$ was PVC of 200 micron thick and 5 cm wide, cemented to the lamina strip $L_2$ which was polyester of 25 micron thick and the same width. Two pieces 15 and 16 of 300 cm in length were used, overlapping in the described manner over a length of 7.5 cm. The weight loading was increased until the mutual bond between the pieces failed at a dead-weight of 42.5 Kgm, providing convincing evidence of the efficacy of the present invention.

Figure 7:
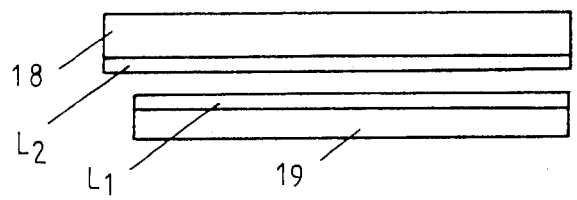

FIG. 7 illustrates use of the invention to attach a renewable veneer for covering a display or other surface liable to soiling. The covered support surface 18 has the polyester film lamina $L_2$ fixed to it, by a suitable adhesive, and the renewable covering is a bi-laminate of the PVC lamina $L_1$ and a polyester sheet 19 providing the renewable outer surface and the attached compensating element of the invention. The detachable bi-laminate $L_1$:19 is both renewable and transparent.

Figure 8:
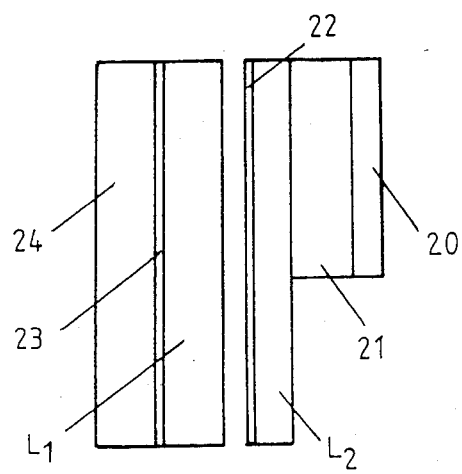

Use of the invention to support three-dimensional objects, as for display, is illustrated in FIG. 8. The object 20 to be supported is fixed to a body of sponge material 21 which is bonded to the polyester lamina $L_2$ which is in turn bonded to an aluminium alloy film 22 so as to conform to the face of the PVC lamina $L_1$. The lamina $L_1$ is bonded to aluminium foil 23 which is bonded to the surface of the supporting structure 24.

I claim:

1. A combination of two mutually-adherent plastics polymer laminae, having different but compatible physical and electrical characteristics whereby respective surfaces thereof are mutually adherent when pressed into surface contact, comprising:
   a first lamina having a permanent or quasi-permanent electrostatic charge of negative polarity produced by electret charges in said lamina and a ductile polished surface providing a relatively high degree of surface friction; and
   a second lamina which either has a positive electrostatic charge or is capable of being polarised by induction to acquire such a charge, which has a stable polished surface and which is of high tensile strength;
   said first lamina having a trapped compensating electrostatic charge on its other surface by virtue of a closely disposed element attached to that surface.

2. The combination according to claim 1, wherein said attached element is a metallic film.

3. The combination according to claim 2, wherein said attached element is a metal foil attached to said first lamina.

4. The combination according to claim 1, wherein said first lamina is PVC sheet and said second lamina is a polyester material.

5. The combination according to claim 4, wherein said second lamina is polyester terephthalate.

6. The combination according to claim 1, wherein said attached element is said second lamina itself thus providing the combination as a bi-laminated arrangement.

7. The combination according to claim 6, wherein said bi-laminated arrangement is of strip-like form whereby it can be used as a binding or strapping strip, with one surface of the strip being strongly but releasably adherent to the other surface of the strip.

8. The combination according to claim 1, wherein said attached element is attached by an adhesive, on its side remote from said first lamina, to a backing layer or board.

9. The combination according to claim 8 in the form of a notice or display board with said first lamina at the front surface thereof, and wherein said second lamina provides or is attached to display matter.

10. The combination according to claim 1, wherein said first lamina is one component of a tri-laminate consisting of the first lamina, said attached element and a flexible backing layer adapted to be pasted onto a surface to be decorated, such as a wall surface, and said second lamina is laminated to the back of decorative sheet material.

* * * * *